United States Patent [19]
Choi et al.

[11] Patent Number: 6,084,893
[45] Date of Patent: Jul. 4, 2000

[54] APPARATUS AND METHOD OF LASER POWER AND FREQUENCY STABILIZATION OF RADIO FREQUENCY EXCITED LASER USING OPTOGALVANIC EFFECT

[75] Inventors: Jong Woon Choi; Young Boong Chung; Jeong Ser Park, all of Taejon, Rep. of Korea; Strzelec Marek; Kopica Mirek, both of Warsaw, Poland

[73] Assignee: Korea Research Institute of Standards and Science, Taejon, Rep. of Korea

[21] Appl. No.: 09/094,604

[22] Filed: Jun. 15, 1998

[30] Foreign Application Priority Data

May 7, 1998 [KR] Rep. of Korea ............. 98-16305

[51] Int. Cl.⁷ ........................................... H01S 3/13
[52] U.S. Cl. .................. 372/32; 372/29; 372/38; 372/83
[58] Field of Search .................. 372/9, 29, 32, 372/38, 55, 56, 83

[56] References Cited

U.S. PATENT DOCUMENTS

| | | | |
|---|---|---|---|
| 4,694,458 | 9/1987 | Midavaine et al | 372/32 |
| 4,853,935 | 8/1989 | Lainé et al. | 372/32 |
| 4,856,010 | 8/1989 | Wissman et al. | 372/32 |
| 4,972,425 | 11/1990 | Braski | 372/32 |

OTHER PUBLICATIONS

A.L.S. Smith et al., "Opto–Galvanic Stabilized $Co_2$ Laser", Optics Communications, Vol. 30, No. 2, Aug. 1979, pp. 213–218.

Michael J. Kavaya et al., "Optogalvanic Stabilization and Offset Tuning of a Carbon Dioxide Waveguide Laser", IEEE Journal of Quantum Electronics, Vo. OE–1S, No. 1, Jan. 1982, pp. 19–21.

T. Suzuki, "Optogalvanic Spectroscopy with rf Discharge", Optics Communications, vol. 38, No. 5, 6, Sep. 1, 1981, pp. 364–368.

Chin–Chun Tsai et al., "$CO_2$ Laser Frequency Stabilization Using the Radio–Frequency Optogalvanic Lamb Dip", Applied Optics, vol. 30, No. 27, Sep. 20, 1991, pp. 3842–3845.

C. Stanciulescu et al., "Optical Impedance Spectroscopy", Appl. Phys. Lett. 37 (10), Nov. 15, 1980, pp. 888–890.

*Primary Examiner*—John D. Lee
*Attorney, Agent, or Firm*—Jacobson, Price, Holman & Stern, PLLC

[57] ABSTRACT

An apparatus for and a method of stabilizing the laser power and frequency of a radio frequency excited laser, which are adapted to lock the laser power and frequency of the laser at the vertex of a laser gain curve using an optogalvanic effect generated from the laser itself, thereby stabilizing the laser power and frequency without requiring any specific unit to be arranged inside or outside a cavity of the laser. A capacitor is coupled to a radio frequency inlet of the radio frequency discharge tube. The capacitor serves to induce a part of radio frequency energy, introduced into the radio frequency discharge tube, toward a detector, so that the optogalvanic signal is measured, based on the induced signal, after removing radio frequency components from the induced signal by the detector, thereby enabling a measurement of a variation in input radio frequency energy caused by the optogalvanic effect. Accordingly, it is possible to provide a stable, simple and compact laser exhibiting an improved laser efficiency.

10 Claims, 10 Drawing Sheets

APPARATUS AND METHOD OF LASER POWER AND FREQUENCY STABILIZATION OF RADIO FREQUENCY EXCITED LASER USING OPTOGALVANIC EFFECT

BACKGROUND OF THE INVENTION

1. Field of the Invention

The present invention relates to an apparatus for and a method of stabilizing a laser power and frequency from a radio frequency excited laser using an optogalvanic effect, and more particularly to an apparatus and method of laser power and frequency stabilization of a radio frequency excited laser, which only use a variation in incident or reflecting radio frequency signal depending on an optogalvanic effect generated from the laser itself, as a reference for the stabilization, without using signals obtained from partial detection of output laser beam, by a conventional fast infrared detector.

2. Description of the Prior Art

Power and frequency of a laser depends on an interval between two mirrors which constitute a cavity of the laser. Accordingly, the laser power and frequency is stabilized when the above interval, namely, cavity length, is stabilized to be constant. Typically, three stabilization methods have been used to make such a cavity length constant while coping with a variation in the cavity length caused by thermal expansion or vibrations.

The first stabilization method is illustrated in FIG. 9. As shown in FIG. 9, a piezo electric transducer 31 is attached to one of mirrors constituting a laser cavity 100, namely, a mirror 3. When the laser cavity 100 varies in length at a frequency of about 520 Hz, an oscillation of laser output occurs. The output from the laser is split by an optical splitter 12 so that it is partially transmitted to an optical detector 13. The transmitted oscillating signal is detected by the optical detector 13 so that it is subsequently used as a reference signal for a laser power and frequency stabilization.

The second stabilization method is illustrated in FIG. 10. In accordance with this method, a high-voltage direct current (DC) discharge tube 14 is arranged in the laser cavity 100, in place of the optical detector used in the first stabilization method, as shown in FIG. 10. In this case, an oscillating signal generated from the discharge tube 14 is used as a reference signal for a laser power and frequency stabilization.

The third stabilization method is to attenuate all laser outputs with a level higher than a minimum power, using an optical attenuator arranged outside the laser.

The stabilization method, wherein a reference signal for stabilization is generated, based on a signal split from an output from the laser by the optical splitter 12, involves a reduction in laser power because the laser output is partially used. Furthermore, since the optical splitter 12 is arranged on the optical path of the laser, it is difficult to obtain an accurate optical axis alignment for the optical splitter 12. In addition, a variation in the transverse mode of the laser may occur.

The stabilization method, wherein the high-voltage DC discharge tube 14 is additionally arranged in the cavity so as to use an oscillating signal generated from the discharge tube 14 as a reference signal, involves a degradation in the oscillation efficiency of the laser due to the provision of the discharge tube 14.

In addition, the above two methods involve a complex laser arrangement resulting in a frequent failure in laser operation. This results in an increase of costs.

In the case of the method, in which an attenuator is arranged outside the laser to obtain a stabilized laser power, a degradation in laser efficiency occurs because the laser power is optionally attenuated. Similar to the above mentioned methods, the laser arrangement is complex because of the use of the additional unit. As a result, an increase in costs occurs.

In association with the present invention, the following papers have been referenced:

Related Paper

1. A. L. S. Smith and S. Moffatt, "Opto-galvanic stabilized $CO_2$ laser," Optics comm., Vol. 30, No. 2, pp. 213–218, 1979.

2. Michael J. Kavaya, Robert T. Menzies, and Uri P. Oppenheim, "Optogalvanic stabilization and offset tuning of a carbon dioxide waveguide laser," IEEE J. Quantum Electron., Vol. QE-18, No. 1, pp. 19–21, 1982.

3. T. Suzuki, "Optogalvanic spectroscopy with rf discharge," Optics comm., Vol. 38, No. 5,6, pp. 374–368, 1981.

4. Chin-Chun Tsai, Tyson Lin, Cherng-Yn Shieh, Tsu-Chiang Yen, and Jow-Tsong Shy, "$CO_2$ laser frequency stabilization using the radio-frequency optogalvanic Lamb dip," Appl. Opt., Vol. 30, No. 27, pp. 3842–3845, 1991.

5. C. Stanciulescu, r. C. Bobulescu, A. Surmeian, D. Popescu, and lovitzu Popescu, C. B. Collins, "Optical impedance spectroscopy," Appl. Phys. Lett. 37(10), pp. 888–890, 1980

SUMMARY OF THE INVENTION

The present invention is concerned with an apparatus for and a method of simply and efficiently stabilizing the laser power and frequency of a radio frequency excited laser while using a simple configuration. Therefore, an object of the invention is to provide an apparatus for and a method of stabilizing the laser power and frequency of a radio frequency excited laser, which apparatus and method are adapted to lock the laser power and frequency of the laser at the vertex of a laser gain curve using an optogalvanic effect generated from the laser itself, thereby stabilizing the laser power and frequency without requiring any specific unit to be arranged inside or outside a cavity of the laser.

In accordance with one aspect, the present invention provides an apparatus for and a method of stabilizing the laser power and frequency of a radio frequency excited laser using an optogalvanic effect, comprising: a laser cavity including a planar grating serving as a wavelength selection and output mirror, a total reflection mirror attached with a piezo electric transducer at a surface thereof opposite to the planar grating, the piezo electric transducer serving to tune the laser frequency, a radio frequency discharge tube arranged between the planar grating and the total reflection mirror, the radio frequency discharge tube with two Brewster windows, isolate it from the laser mirror and assure a linearly polarized laser output beam, and an diaphragm arranged between the radio frequency discharge tube and the total reflection mirror so that a basic oscillation mode, namely, $TEM_{00}$, of the laser cavity corresponds to a transverse mode; a radio frequency generator adapted to generate radio frequency waves to be applied to the laser cavity, thereby enabling a radio frequency discharge in the radio frequency discharge tube; a $\pi$-matching circuit coupled between the radio frequency generator and the laser cavity, the $\pi$-matching circuit serving to obtain an impedance matching between the radio frequency generator and the laser cavity, thereby minimizing a reflection of high frequency energy; a lock-in stabilizer coupled between the piezo electric transducer and the π-matching circuit and adapted to achieve a frequency stabilization of the laser, the lock-in stabilizer being provided with a high-voltage amplifier adapted to directly drive the piezo electric transducer, and a signal generator adapted to generate a reference signal; means for measuring a variation in input radio frequency energy caused by an optogalvanic effect generated in the laser cavity; and a detector for receiving a part of radio frequency energy induced through the measuring means, removing radio frequency components from the received radio frequency energy, and sending the resultant signal free of radio frequency components to the lock-in stabilizer.

In accordance with another aspect, the present invention provides a method for and a method of stabilizing the laser power and frequency of a radio frequency excited laser using an optogalvanic effect, comprising the steps of: appropriately moving a grating included in a laser cavity of the laser, thereby selecting an desired oscillating laser wavelength; applying a sine wave signal to a piezo electric transducer included in the laser cavity, thereby generating an optogalvanic effect, in the laser cavity, resulting in a variation in radio frequency energy introduced into or reflected from a discharge tube arranged in the laser cavity; inducing a part of the radio frequency energy toward a detector; removing radio frequency components from the induced radio frequency energy by the detector, thereby generating an optogalvanic signal free of radio frequency components; executing a detection for the optogalvanic signal based on a sine wave, and then executing a synchronous detection for the resultant optogalvanic signal by a lock-in stabilizer, thereby deriving a voltage proportional to a gain curve given for the laser and the position of a vertex of the gain curve; integrating the signal derived by the synchronous detection, converting the resultant signal into the form of a DC voltage; applying the resultant signal to the piezo electric transducer; and repeating the above steps to continuously vary the length of the laser cavity until the signal derived by the synchronous detection has a zero level, thereby causing the laser to oscillate at the vertex of the gain curve so as to maintain the laser cavity to be constant in length.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Figure 1:
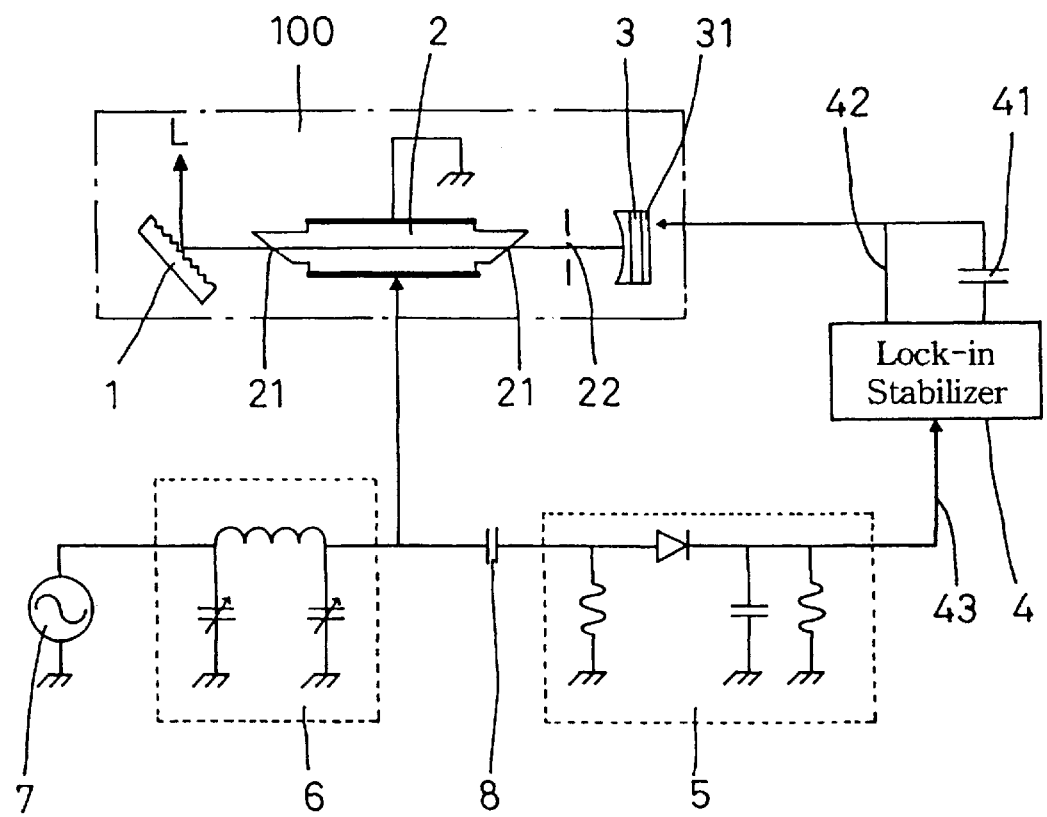
FIG. 1 is a schematic view illustrating an apparatus for stabilizing the laser power and frequency of a radio frequency excited laser using an optogalvanic effect in accordance with an embodiment of the present invention.

The oscillating frequency and power of a gas laser using a Fabry-Perot cavity depends on an optical length of the cavity. For this reason, in order to stabilize the oscillating frequency and power of the laser, it is important to prevent the optical length of the cavity from being affected by the environment where the laser is used. Otherwise, a variation in the optical length of the cavity should be compensated for. In other words, the optical length of the laser cavity, which may vary depending on the environment involving a variation in ambient temperature around a discharge tube used, mechanical vibrations, and a variation in the pressure of laser gas used, should be kept constant.

A variation in laser radiation flux occurring in the laser cavity results in variations in laser beam intensity, spectrum distribution, gas pressure, discharge current, and discharge impedance. In this regard, when vibrations of a certain frequency (for example, 522 Hz) are applied to a piezo electric transducer arranged on the optical axis of the laser cavity under the condition in which a mirror is disposed on the piezo electric transducer, the optical length L of the laser cavity vibrates at the above frequency. That is, a variation in the cavity length, ΔL, occurs. The intensity of laser beam is modulated at the same frequency as that of the cavity length, along a laser gain characteristic. When the average mode frequency of the laser beam intensity being modulated is lower than the central frequency of the same laser beam intensity, the laser beam intensity has a phase opposite to that of the impedance variation ΔZ. On the other hand, where the average mode frequency is higher than the central frequency, the impedance variation ΔZ increases correspondingly to a difference of the mode frequency from the central frequency. In such a way, a considerable variation in the radio frequency discharge impedance occurs even when a slight variation in laser beam intensity occurs in the laser cavity. For instance, an intensity variation of only 1% results in a considerable variation in the radio frequency discharge impedance corresponding to about 0.1%. Based on such an impedance variation in the laser cavity, a variation in incident or reflecting radio frequency energy is detected. Based on the detected signal, a frequency discriminator generates an error signal which is, in turn, fed back to the piezo electric transducer. In such a way, a laser frequency stabilization is carried out in accordance with the present invention.

The present invention eliminates the use of any separate discharge tube to obtain an optogalvanic signal. In accordance with the present invention, a desired frequency stabilization is achieved using an impedance variation resulting from an optogalvanic effect generated from the cavity itself when the laser power varies in accordance with a gain distribution given for the laser.

In other words, the present invention accomplishes a frequency stabilization of a radio frequency excited laser using a variation in the radio frequency energy, which is introduced into or reflected from the cavity of the laser, resulting from a variation in the impedance of the laser caused by an optogalvanic effect generated in the cavity itself.

FIG. 1 illustrates a laser power and frequency stabilization apparatus according to an embodiment of the present invention. In the illustrated embodiment of the present invention, the stabilization apparatus is applied to a radio frequency excited carbon dioxide laser in order to achieve a frequency stabilization for the laser.

Referring to FIG. 1, a laser cavity 100 is shown which includes a planar grating 1 and a total reflection mirror 3. The planar grating 1 serves as a wavelength selector and output mirror. A radio frequency discharge tube 2 is also arranged between the planar grating 1 and total reflection mirror 3. The radio frequency discharge tube 2 has two electrodes made of, for example, aluminum. Radio frequency energy is supplied between the electrodes of the radio frequency discharge tube 2, thereby generating a desired radio frequency discharge in the radio frequency discharge tube 2. The radio frequency discharge tube 2 is provided at opposite ends with Brewster windows 21, respectively, so that it is isolated from the total reflection mirror 3 while obtaining a linearly polarized laser beam from an output laser beam L. A piezo electric transducer 31 is attached to a surface of the total reflection mirror 3 opposite to the radio frequency discharge tube 2 in order to vary the length of the laser cavity 100, namely, to tune the laser frequency.

In order to stabilize the laser frequency, it is required to preferentially generate oscillations of a single longitudinal mode and a single transverse mode. To realized it, a diaphragm 22 is arranged between the discharge tube 2 and total reflection mirror 3 so that the basic oscillation mode, namely, $TEM_{00}$, of the laser cavity 100 corresponds to a transverse mode. A radio frequency generator 7 is also provided which serves to generate radio frequency waves to be applied to the laser cavity 100. A π-matching circuit 6 is coupled between the radio frequency generator 7 and laser cavity 100. The π-matching circuit 6 serves to obtain an impedance matching between the radio frequency generator 7 and laser cavity 100, thereby minimizing a reflection of high frequency energy. In order to achieve a frequency stabilization of the laser, a lock-in stabilizer 4 is coupled between the piezo electric transducer 31 and π-matching circuit 6. The lock-in stabilizer 4 is provided with a high-voltage amplifier 42 adapted to directly drive the piezo electric transducer 31, and a signal generator 41 adapted to generate a reference signal. That is, the lock-in stabilizer 4 is a kind of a lock-in amplifier.

As mentioned above, when the piezo electric transducer 31 drives, a modulation of the laser power L is generated in accordance with vibrations generated by the piezo electric transducer 31. Such a variation in the laser power L generates an optogalvanic effect in the laser cavity 100, thereby resulting in a variation in the impedance of the radio frequency discharge tube 2. Accordingly, the radio frequency energy applied to the radio frequency discharge tube 2 varies. In order to measure such a variation in the input radio frequency energy caused by the optogalvanic effect, a capacitor 8 is coupled to the radio frequency inlet of the radio frequency discharge tube 2. A detector 5 is also coupled to the capacitor 8. The detector 5 receives a part of radio frequency energy induced through the capacitor 8 and removes radio frequency components from the received radio frequency energy. The detector 5 sends the resultant signal free of radio frequency components to the lock-in stabilizer 4.

Figure 2:
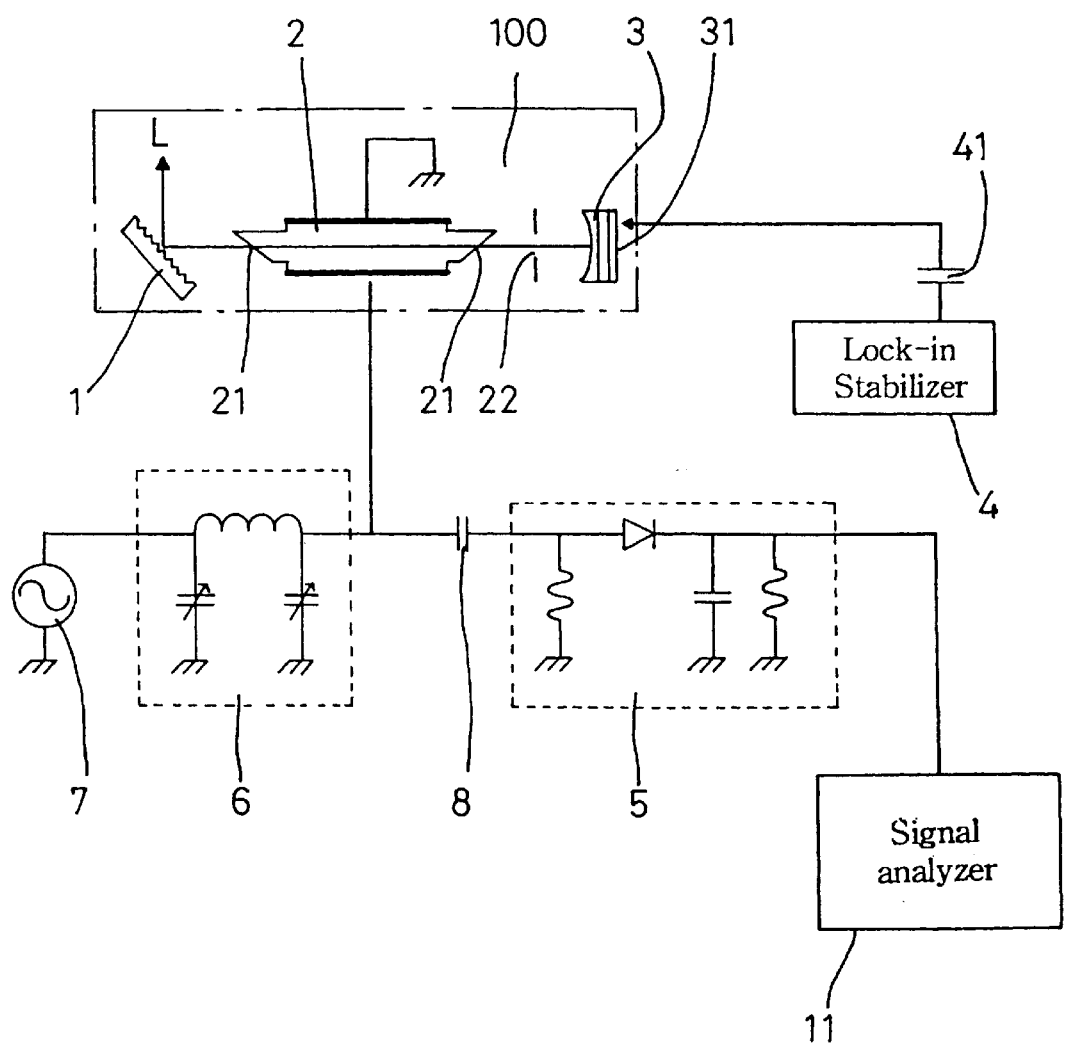
FIG. 2 is a schematic view illustrating an experimental apparatus for demonstrating an optogalvanic effect generated in a radio frequency excited laser.
Figure 3:
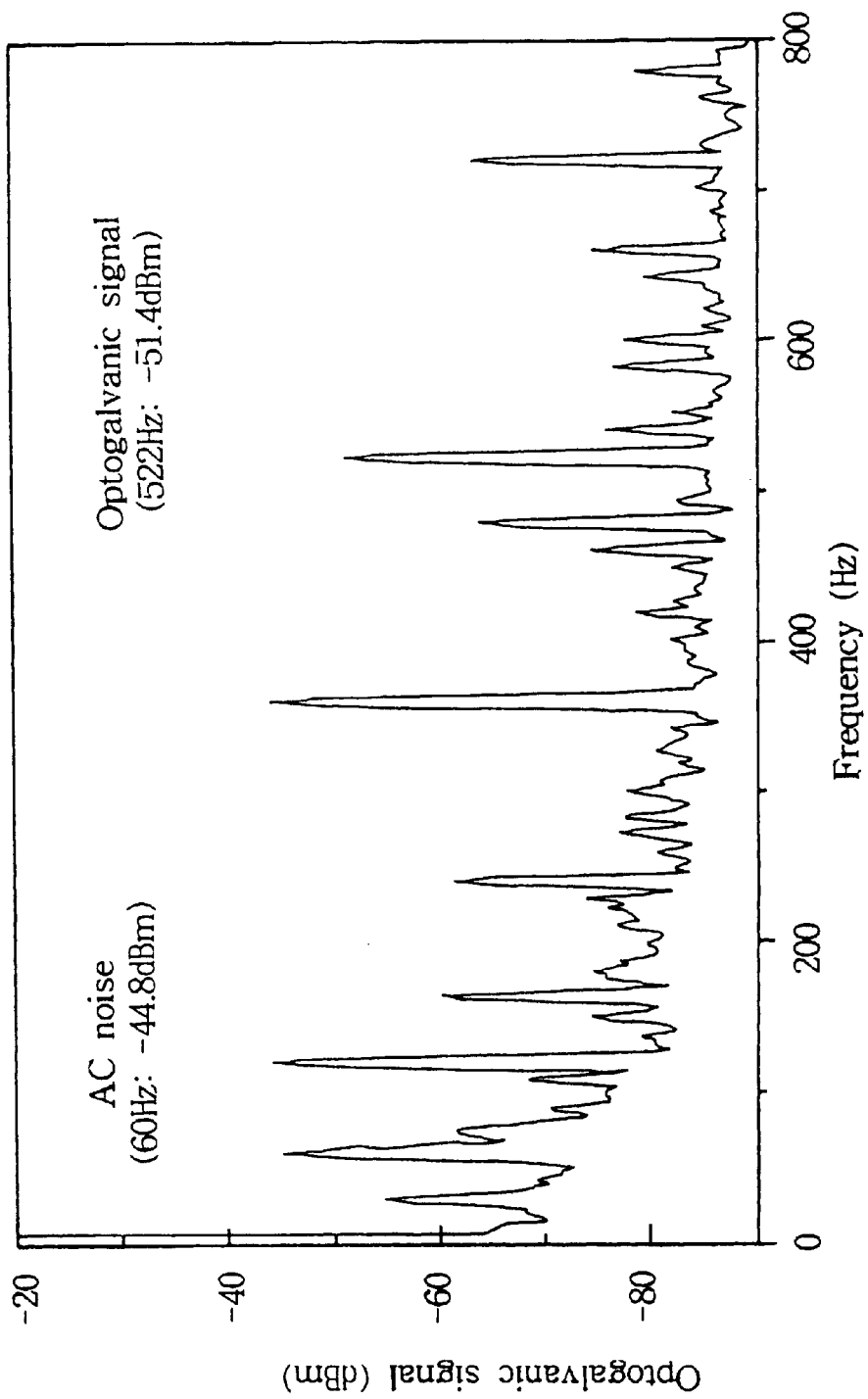
FIG. 3 is a spectrum diagram depicting a variation in the intensity of an optogalvanic signal depending on vibrations of a laser cavity length.

In order to demonstrate a laser power and frequency stabilization of the radio frequency excited carbon dioxide laser accomplished using an optogalvanic effect in accordance with the present invention, experiments were made using an experimental apparatus of FIG. 2 having the same basic configuration as the above-mentioned apparatus, as follows.

In the experiments, the radio frequency excited carbon dioxide laser used is of a gas circulation type. The laser cavity 100 was that having a total length of 646 mm. For the total mirror 3, a mirror having a reflectance coefficient of 100% and a focus length of 10 m was used. The planar grating 1 used as a wavelength selector and output mirror was a gold-coated 150 g/mm planar grating available from Jobin-Yovon Company. The electrodes of the radio frequency discharge tube 2 was made of aluminum and had a width of 5 mm and a length of 300 mm. The radio frequency generator 7 was that capable of generating a power of 67 W with a frequency of 83 MHz. The brewster windows 21 were made of ZnSe. The piezo electric transducer 31 was that capable of generating a variation in the length of the laser cavity 100 to a maximum of 13 μm/1,600 V. The diaphragm 22, which serves to obtain a basic oscillation mode, namely, $TEM_{00}$, of the laser cavity 100 corresponding to a transverse mode, had a diameter of 5 mm. A laser medium gas of $CO_2$: $N_2$: He was continuously supplied, in a ratio of 1:5.5:24.5, to the radio frequency discharge tube 2 so as to maintain the radio frequency discharge tube 2 at a total pressure of 25 torr. Under the above conditions, experiments were performed while selecting the P(20)-th one of oscillating laser beams, L.

First, an experiment for demonstrating the influence of an optogalvanic effect depending on a variation in the laser power of the above mentioned radio frequency excited laser was carried out as follows.

That is, this experiment was performed to demonstrate the dependency of an optogalvanic effect, generated when the length of the laser cavity 100 vibrates very slightly due to vibrations of the piezo electric transducer 31. First, a sine wave signal (522 Hz) with a voltage of about 150 V p.p. generated from the lock-in was applied to the piezo electric transducer 31, thereby causing the piezo electric transducer 31 to generate vibrations. In order to measure an optogalvanic effect caused by the vibrations of the piezo electric transducer 31, a part of radio frequency energy induced through the capacitor 8 was sent to the detector 5, thereby removing radio frequency components (83 MHz) from the radio frequency energy. The resultant signal free of radio frequency components was then analyzed in terms of spectrum using a signal analyzer 11 coupled to the detector 5. After the analysis, an optogalvanic signal of −51.4 dBm and 522 Hz was measured. This means that an optogalvanic effect was generated due to a modulation of the laser power L, namely, a variation in the cavity length, caused by the vibrations of the piezo electric transducer 31. Based on such an optogalvanic signal, accordingly, it is possible to measure a variation in the length of the laser cavity 100 caused by a slight vibration of the piezo electric transducer 31.

The following experiment was also carried out to measure a variation in the intensity of the optogalvanic signal depending on a variation in the gain of the laser depicted in the form of a laser gain curve.

Figure 4:
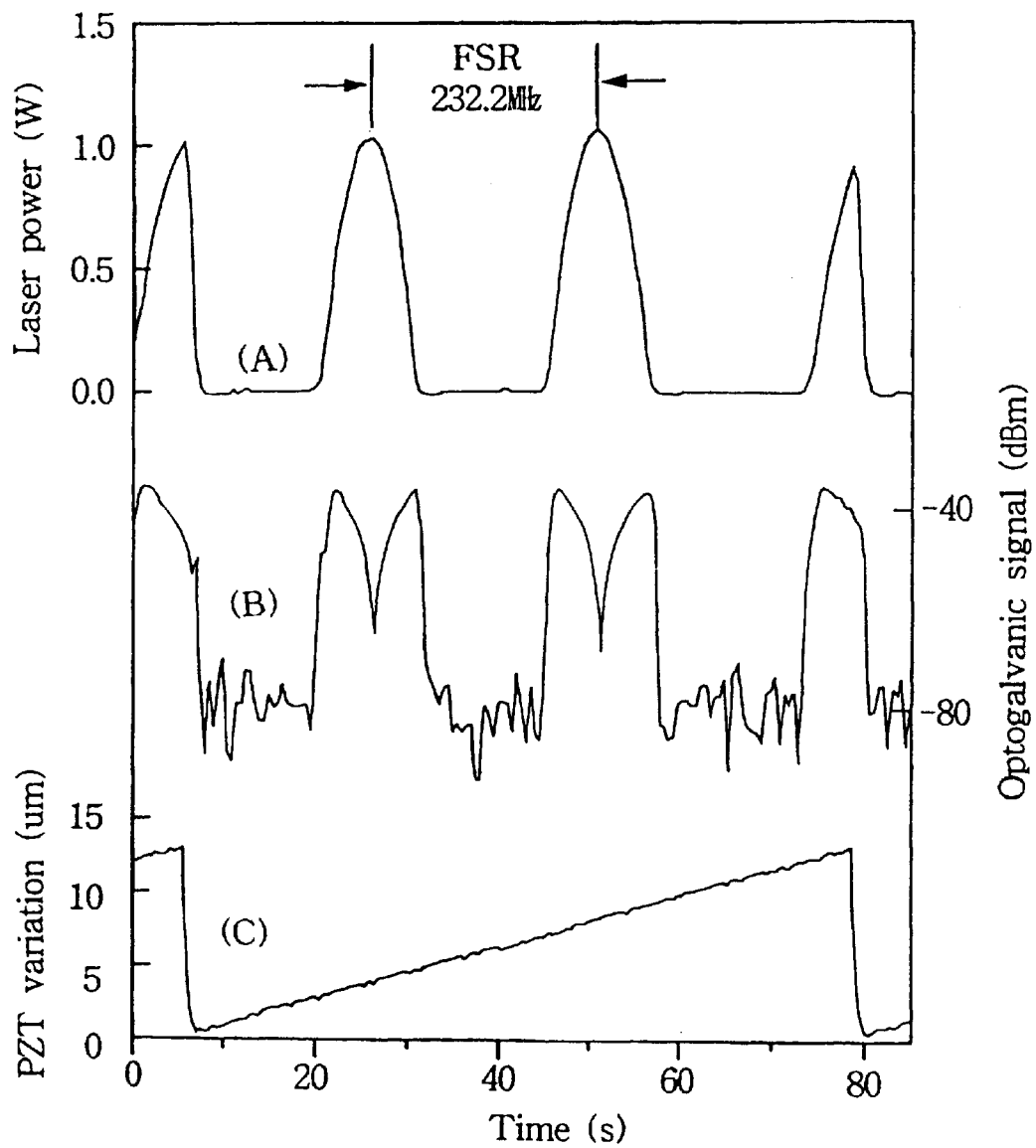
FIG. 4 is a waveform diagram depicting a variation in the intensity of an optogalvanic signal depending on a variation in laser power.

In this experiment, a ramp signal was applied to the piezo electric transducer 31 while gradually increasing the voltage of the ramp signal from 0 V to 1,600 V for about 75 seconds, as indicated by the curve C of FIG. 4. Simultaneously, a sine wave signal was applied to the piezo electric transducer 31. As a result, the length of the laser cavity 100 varied by a range of 0 to 13 m. This variation in the cavity length resulted in a variation in the gain of the oscillating laser beam as depicted by the gain curve A of FIG. 4. Also, a variation in the level of the optogalvanic signal corresponding to a variation in the laser power occurred as depicted by the waveform diagram B of FIG. 4. By this experiment, it was demonstrated that the intensity of the optogalvanic signal was proportional to the gradient of the gain curve, and that the gain curve of the selected P(20)-th laser beam was repeatedly exhibited at 232.2 MHz corresponding to a free spectral range associated with a cavity length of 646 mm.

The present invention also provides a method for stabilizing the laser power and frequency of a radio frequency excited laser by locking the laser power and frequency of the laser at the vertex of a laser gain curve using an optogalvanic effect generated from the laser itself. In accordance with this method, an optional oscillating laser beam L is first selected by appropriately moving the grating 1. Thereafter, the laser is controlled to oscillate in the vicinity of the vertex of the gain curve by varying DC bias voltage applied to the piezo electric transducer 31. In this state, a feedback loop of the lock-in stabilizer 4 is activated. In this case, three signals are applied to the piezo electric transducer 31. These signals include a DC bias voltage signal for finding an activation point, a sine wave signal of 522 Hz used as a reference signal for the lock-in stabilizer 4, and a compensation voltage signal obtained by integrating error signals generated and amplifying the resultant signal.

When the sine wave signal of 522 Hz is applied as a reference signal to the piezo electric transducer 31, the laser power L is modulated in the form of a sine wave. Since an optogalvanic effect is generated in the laser cavity 100 due to the modulation of the laser power L, the impedance of the radio frequency discharge tube 2 is also modulated. In accordance with this impedance modulation of the radio frequency discharge tube 2, radio frequency energy introduced into or reflected from the discharge tube 2 is also modulated to have the same frequency as that of the sine wave signal. When the resultant modulated signal passes through the detector 5, an optogalvanic signal free of radio frequency components is obtained. The optogalvanic signal, which is derived by a detection based on a sine wave, is then applied to the lock-in stabilizer 4 which, in turn, performs a synchronous detection for the optogalvanic signal. As a result, a voltage proportional to the gain curve is derived. Based on the derived voltage, it is possible to determine the position of the vertex of the gain curve. The signal derived by the synchronous detection is integrated and then converted into the form of a DC voltage. The resultant signal is then applied to the piezo electric transducer 31. The integrated value, namely, the signal applied to the piezo electric transducer 31, serves to continuously vary the length of the laser cavity 100 until the signal obtained by the synchronous detection has a zero level. When the signal obtained by the synchronous detection has a zero level, the laser oscillates at the vertex of the gain curve. In accordance with this principle, the length of the laser cavity 100 is kept constant. Thus, a stabilization of the laser power and frequency is achieved.

Figure 5:
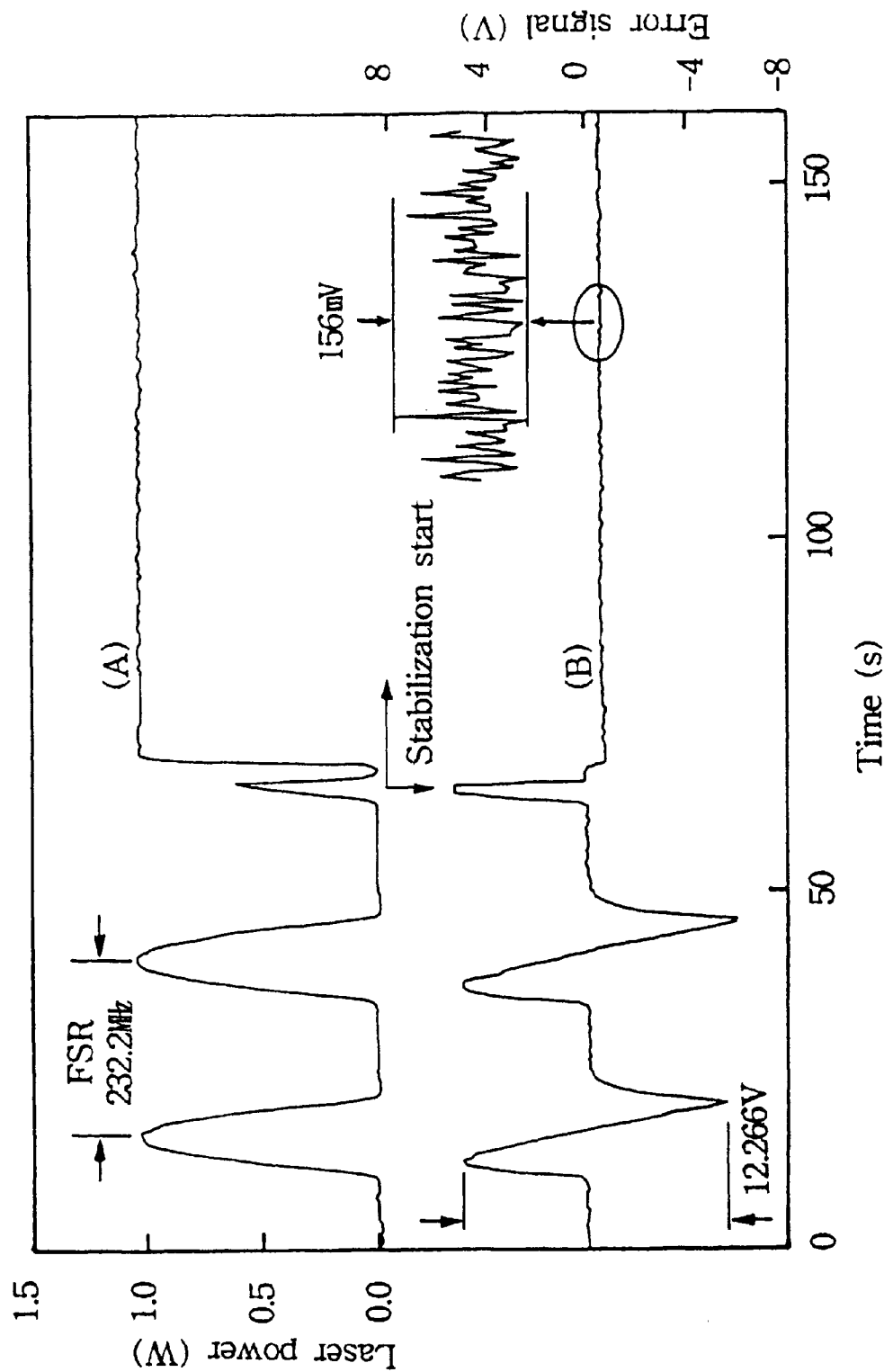
FIG. 5 is a waveform diagram depicting variations of various signals indicative of the results obtained after stabilizing the laser power and frequency of the radio frequency excited carbon dioxide laser using an optogalvanic effect in accordance with the present invention.

FIG. 5 illustrates the results obtained after stabilizing the frequency of the radio frequency excited carbon dioxide laser using an optogalvanic effect in accordance with the present invention. Referring to FIG. 5, it can be found that both the laser frequency and power are stabilized by the lock-in stabilizer.

The curve A of FIG. 5 represents a gain distribution depending on a variation in the cavity length whereas the curve B of FIG. 5 represents a primary differential signal of the gain depicted by the gain curve. The laser frequency change width $\Delta v$ corresponds to a value obtained by multiplying the width of the gain distribution, F, by a ratio $\Delta V/V$, between a maximum amplitude of error signals, V, when the laser frequency is not stabilized and an error signal $\Delta V$ when the laser frequency is stabilized. Accordingly, this laser frequency change width can be expressed by the product of the gradient of the error function, F/V, by "$\Delta V$" ($\Delta v=(F/V)\Delta V$). In the case of FIG. 5, the frequency tuning width generated in the present apparatus corresponds to about 1.446 MHz. This value is indicative of a frequency stability $\Delta v/v$ of $5.1 \times 10^{-8}$ for an laser frequency corresponding to 10.6 $\mu$m. Meanwhile, the power variation occurring when the laser operates freely is expressed by "$\Delta P/P$". Since a great power variation occurs in the case of a laser oscillating in a single longitudinal mode, the laser exhibits a power variation up to 100%. However, where a frequency stabilization is obtained using the stabilization apparatus according to the present invention, the power variation is greatly improved. That is, a power variation of only 2.9% is exhibited.

The measurement of a variation in incident or reflecting radio frequency energy caused by an optogalvanic effect resulting from a variation in the length of the cavity may be achieved using various methods as follows.

Figure 6:
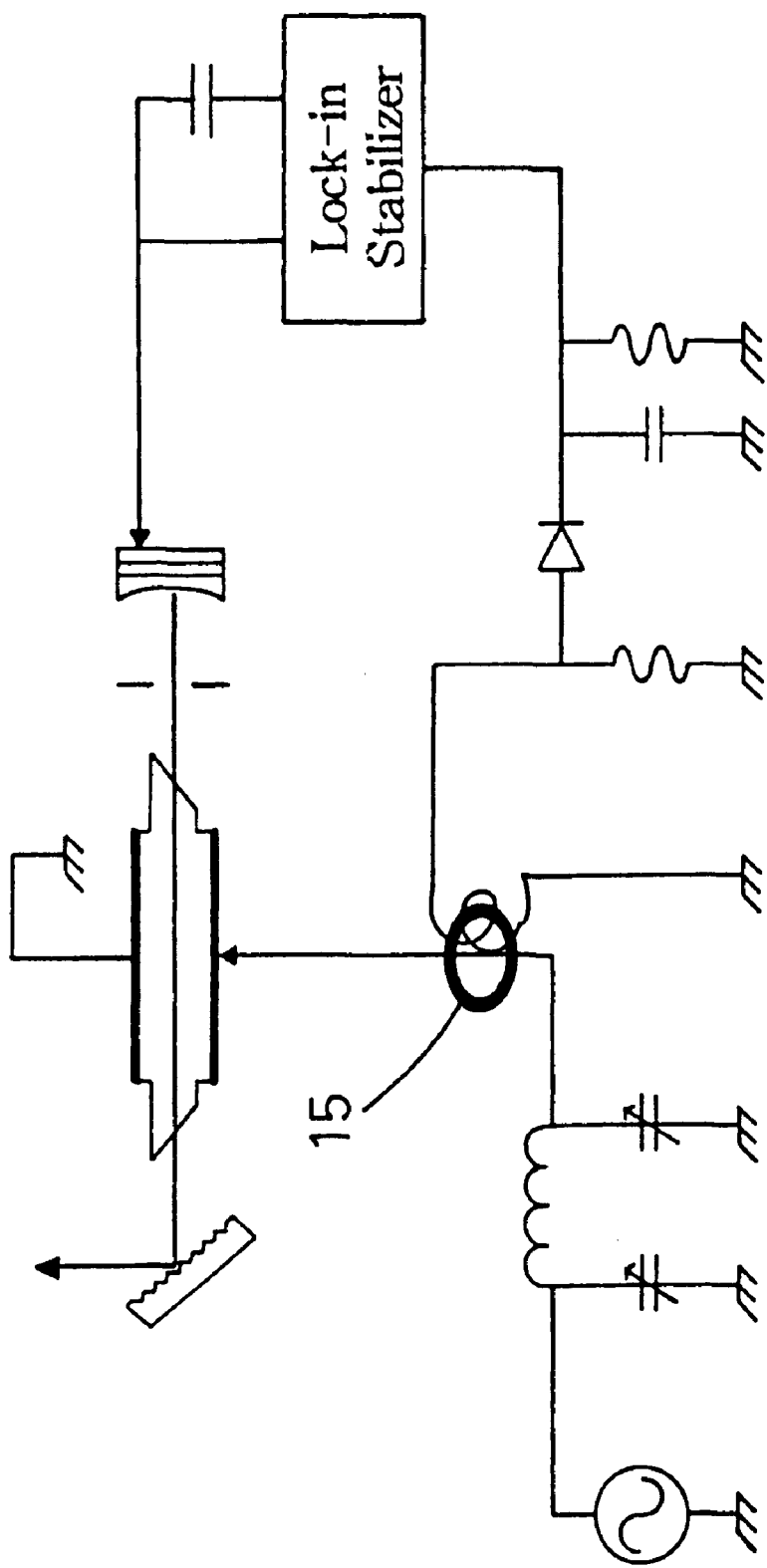
FIG. 6 is a schematic view illustrating a laser power and frequency stabilization apparatus using a toroidal coil coupler in accordance with another embodiment of the present invention.

FIG. 6 is a schematic view illustrating a laser power and frequency stabilization apparatus using a toroidal coil coupler in accordance with another embodiment of the present invention. In order to measure a variation in the radio frequency energy applied to the radio frequency discharge tube, the radio frequency energy input line of the radio frequency discharge tube extends through a toroidal coil coupler 15. In this case, an optogalvanic signal generated is measured, based on a voltage signal generated across the toroidal coil coupler 15, after removing radio frequency components from the voltage signal by a detector.

The radio frequency energy input line passes through the central opening of the toroid on which a copper wire is wound. Using the voltage signal generated across the toroidal coil coupler 15 while being free of radio frequency components, it is possible to measure a variation in the radio frequency energy of incident waves resulting from an optogalvanic signal generated.

Figure 7:
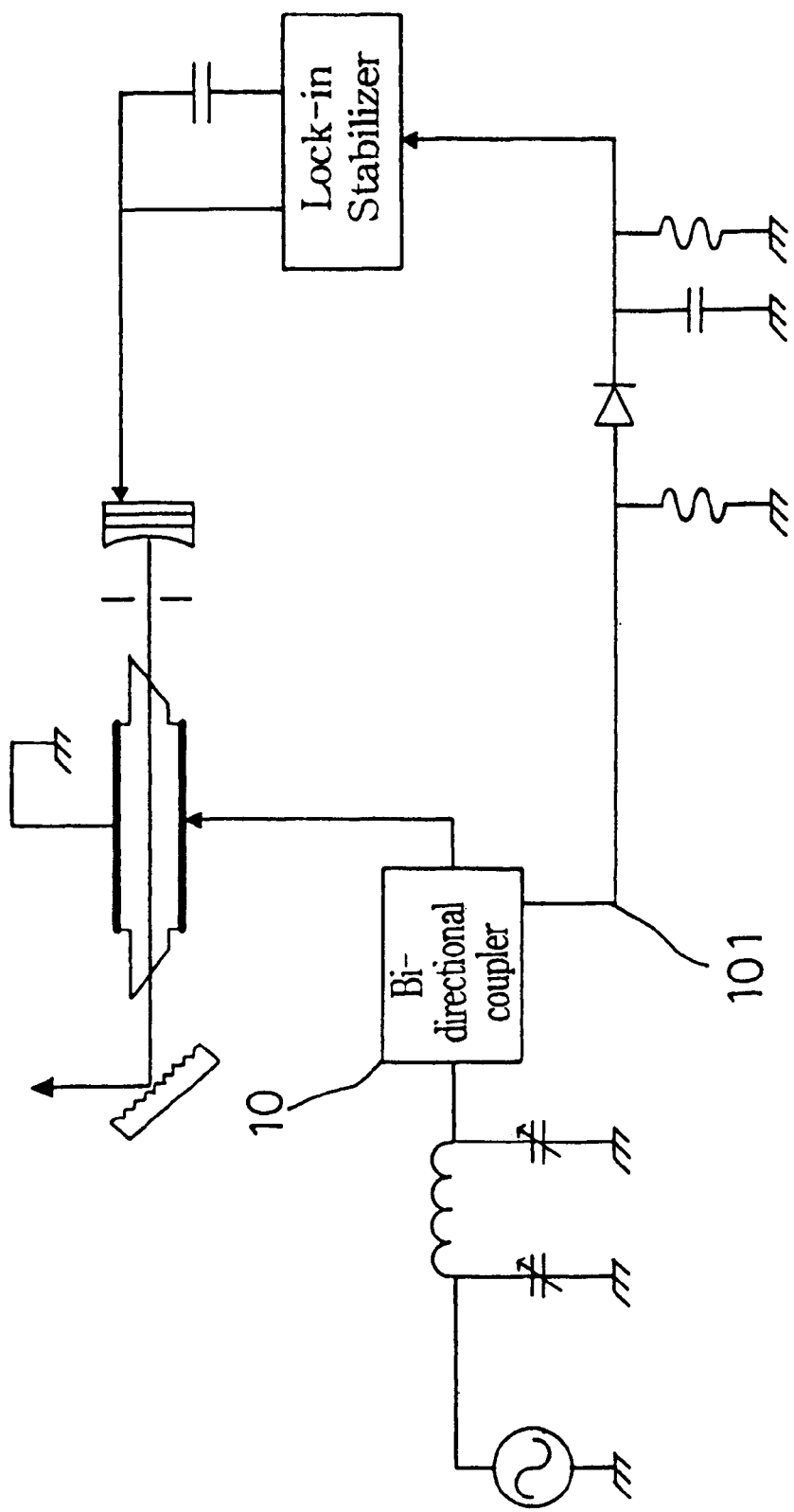
FIG. 7 is a schematic view illustrating a laser power and frequency stabilization apparatus using a bi-directional coupler adapted to measure a variation in the radio frequency energy of incident waves in accordance with another embodiment of the present invention.

FIG. 7 is a schematic view illustrating a laser power and frequency stabilization apparatus using a bi-directional coupler adapted to measure a variation in the radio frequency energy of incident waves in accordance with another embodiment of the present invention. In order to measure a variation in the radio frequency energy introduced into a laser cavity, a bi-directional coupler 10 is coupled to the radio frequency energy input line of the radio frequency discharge tube. In this case, an optogalvanic signal generated is measured, based on a signal output from the bi-directional coupler 10, after removing radio frequency components from the signal by a detector.

That is, a part of the incident radio frequency energy is induced toward a detector via the bi-directional coupler 10.

Thereafter, radio frequency components are removed from the induced signal by the detector. Using the resultant signal, it is possible to measure a variation in the radio frequency energy of incident waves resulting from an optogalvanic effect generated.

Figure 8:
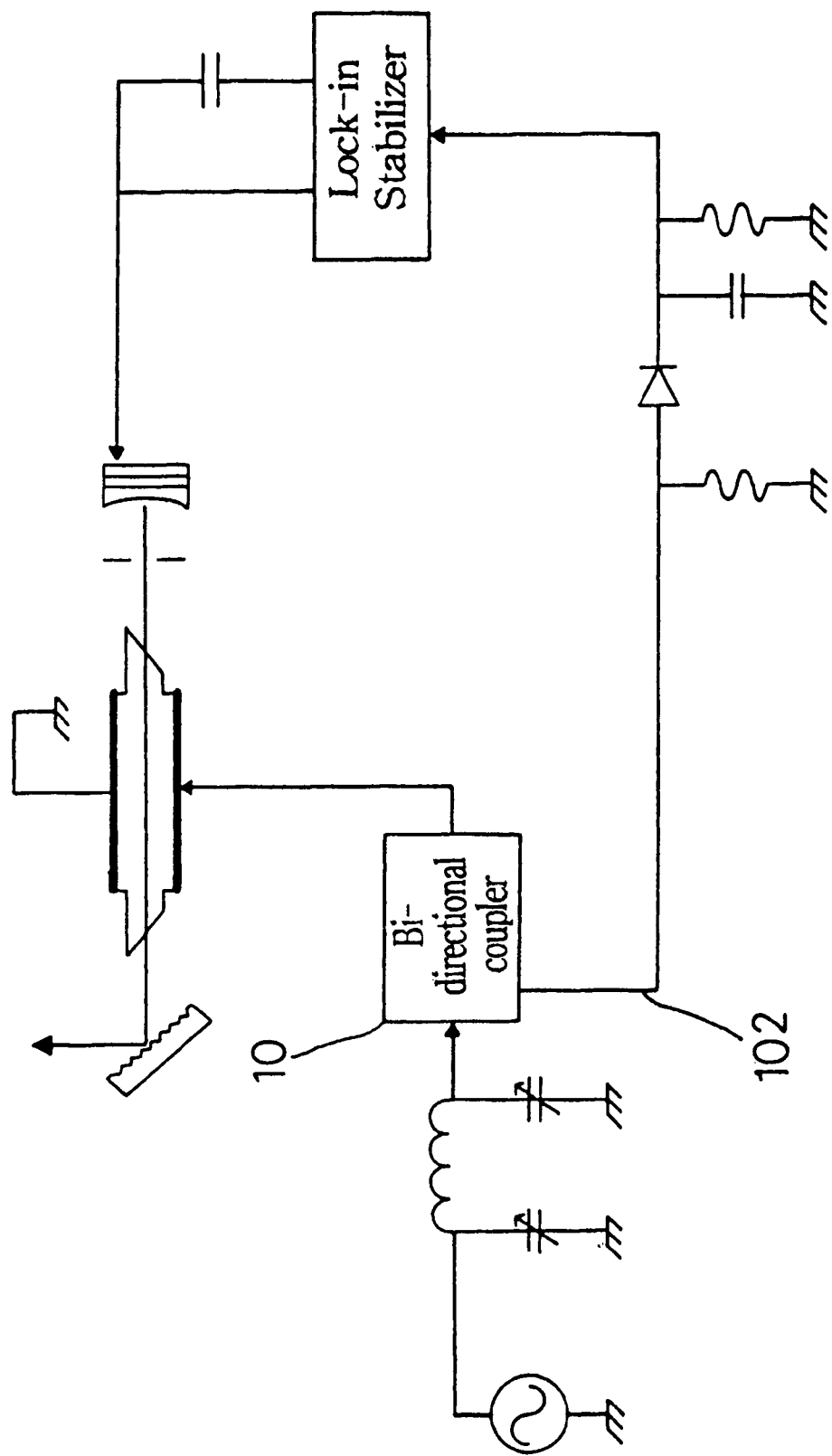
FIG. 8 is a schematic view illustrating a laser power and frequency stabilization apparatus using a bi-directional coupler adapted to measure a variation in the radio frequency energy of reflecting waves in accordance with another embodiment of the present invention.
Figure 9:
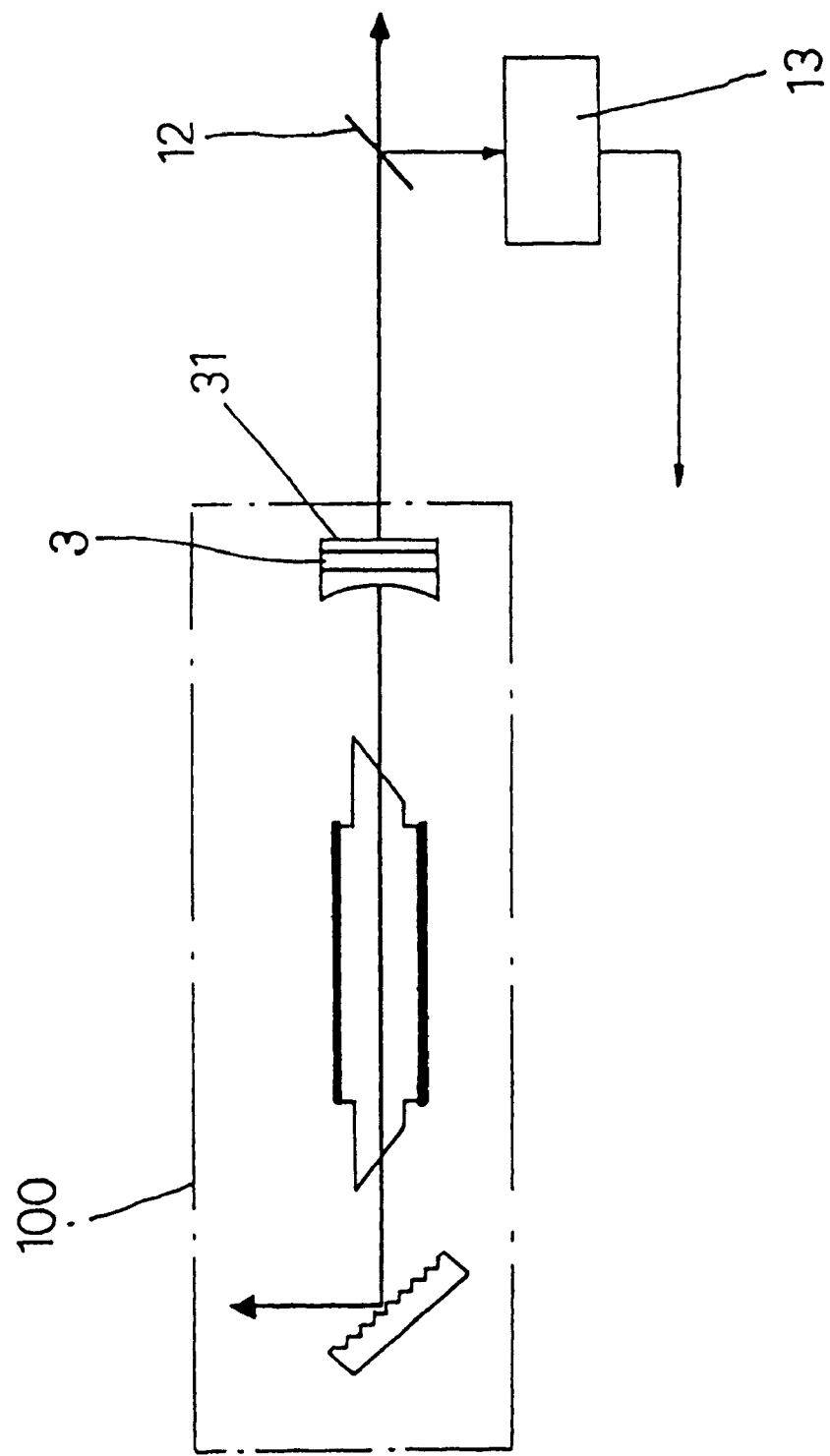
FIG. 9 is a schematic view illustrating a conventional laser power and frequency stabilization apparatus using a beam splitter.
Figure 10:
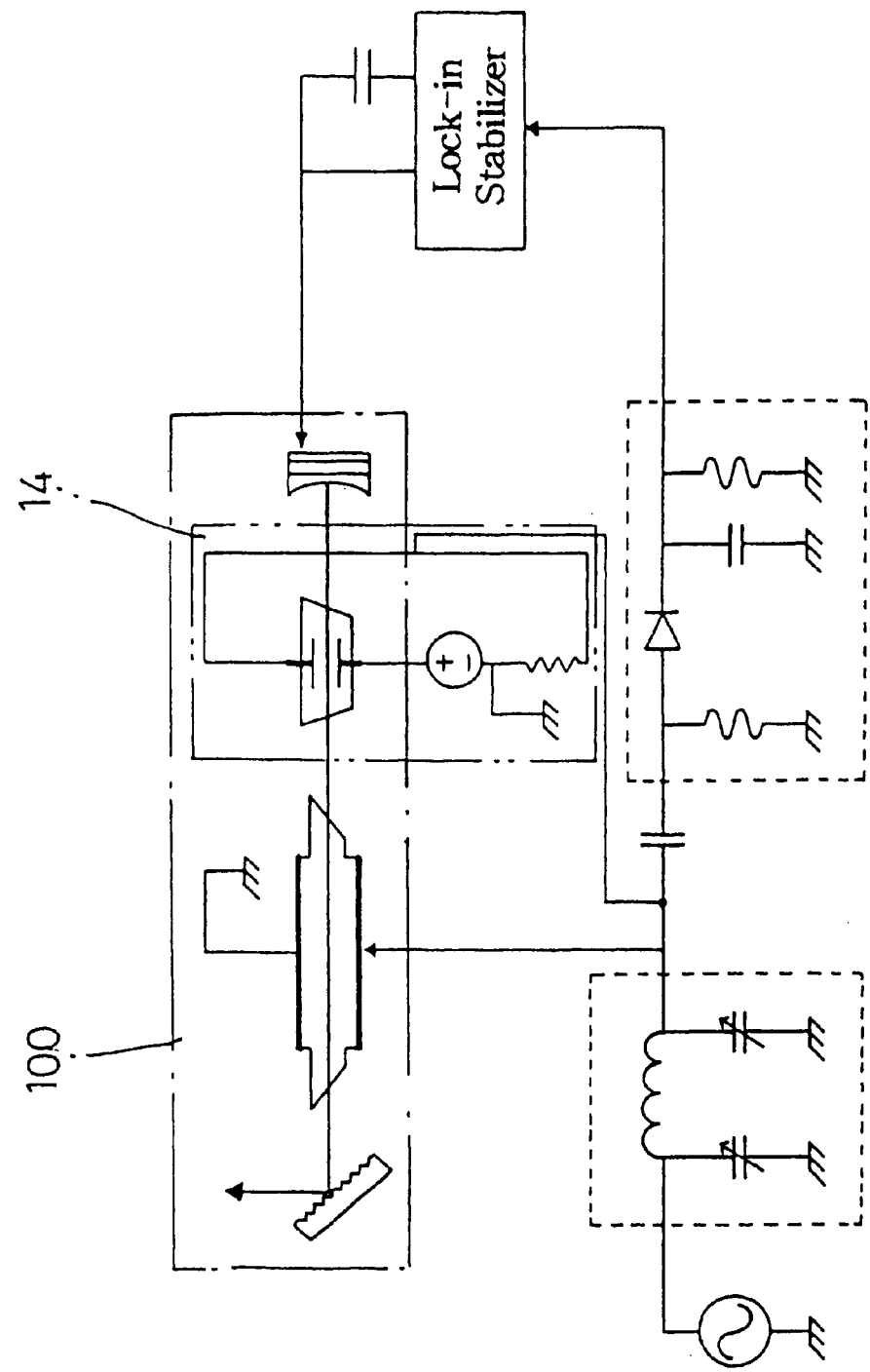
FIG. 10 is a schematic view illustrating a conventional laser power and frequency stabilization apparatus using a DC discharge tube arranged in a laser cavity.

FIG. 8 is a schematic view illustrating a laser power and frequency stabilization apparatus using a bi-directional coupler adapted to measure a variation in the radio frequency energy of reflecting waves in accordance with another embodiment of the present invention. In order to measure a variation in the radio frequency energy reflected from the radio frequency discharge tube, a bi-directional coupler 10 is coupled to the radio frequency energy input line of the radio frequency discharge tube. In this case, an optogalvanic signal generated is measured, based on a signal output from the bi-directional coupler 10, after removing radio frequency components from the signal by a detector.

That is, a part of the reflected radio frequency energy is induced toward a detector via the bi-directional coupler 10. Thereafter, radio frequency components are removed from the induced signal by the detector. Using the resultant signal, it is possible to measure a variation in the radio frequency energy of reflected waves resulting from an optogalvanic effect generated.

As apparent from the above description, the present invention provides an apparatus for and a method of stabilizing the laser power and frequency of a radio frequency excited laser, which apparatus and method achieve a laser power and frequency stabilization using an optogalvanic effect generated in the cavity of the laser itself, without requiring any specific unit to be arranged inside or outside the laser cavity. Accordingly, it is possible to provide a stable, simple and compact laser exhibiting an improved laser efficiency.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for stabilizing the laser power and frequency of a radio frequency excited laser using an optogalvanic effect, comprising:
    a laser cavity including
        a planar grating serving as a wavelength selector and output mirror,
        a total reflection mirror attached with a piezo electric transducer at a surface thereof opposite to the planar grating, the piezo electric transducer serving to tune the laser frequency,
        a radio frequency discharge tube arranged between the planar grating and the total reflection mirror, the radio frequency discharge tube with Brewster windows, so that it is isolated from the total reflection mirror, assures a linearly polarized laser output beam, and
        a variable diaphragm arranged between the radio frequency discharge tube and the total reflection mirror so that a basic oscillation mode, namely, $TEM_{00}$, of a laser resonator corresponds to a transverse mode;
    a radio frequency generator adapted to generate radio frequency waves to be applied to the laser cavity, thereby enabling a radio frequency discharge in the radio frequency discharge tube;
    a π-matching circuit coupled between the radio frequency generator and the laser cavity, the π-matching circuit serving to obtain an impedance matching between the radio frequency generator and the radio frequency discharge tube, thereby minimizing a reflection of high frequency energy;
    a lock-in stabilizer coupled between the piezo electric transducer and the radio frequency discharge tube and adapted to achieve a frequency stabilization of the laser, the lock-in stabilizer being provided with a high-voltage amplifier adapted to directly drive the piezo electric transducer, and a signal generator adapted to generate a reference signal;
    means for measuring a variation of input radio frequency energy caused by an optogalvanic effect generated in the radio frequency discharge tube; and
    a detector for receiving a part of radio frequency energy induced through the measuring means, removing radio frequency components from the received radio frequency energy, and sending the resultant signal free of radio frequency components to the lock-in stabilizer.

2. The apparatus according to claim 1, wherein the measuring means comprises a capacitor coupled to a radio frequency input of the radio frequency discharge tube, the capacitor serving to induce a part of radio frequency energy, introduced into the laser, toward the detector, so that the optogalvanic signal is measured, based on the induced signal, after removing radio frequency components from the induced signal by the detector, thereby enabling a measurement of a variation in input radio frequency energy caused by the optogalvanic effect.

3. The apparatus according to claim 1, wherein the measuring means comprises a toroidal coil coupler, through which a radio frequency energy input line of the laser discharge tube extends, the toroidal coil coupler being coupled to the detector, so that the optogalvanic signal is measured, based on a voltage signal generated across the toroidal coil coupler, after removing radio frequency components from the voltage signal by the detector, thereby enabling a measurement of a variation in input radio frequency energy caused by the optogalvanic effect.

4. The apparatus according to claim 1, wherein the measuring means comprises a bi-directional coupler coupled to a radio frequency energy input line of the radio frequency discharge tube and to the detector, the bi-directional coupler serving to induce a part of radio frequency energy, introduced into the radio frequency discharge tube, toward the detector, so that the optogalvanic signal is measured, based on the induced signal, after removing radio frequency components from the induced signal by the detector, thereby enabling a measurement of a variation in input radio frequency energy caused by the optogalvanic effect.

5. The apparatus according to claim 1, wherein the measuring means comprises a bi-directional coupler coupled to a radio frequency energy input line of the radio frequency discharge tube and to the detector, the bi-directional coupler serving to induce a part of radio frequency energy, reflected from the radio frequency discharge tube, toward the detector, so that the optogalvanic signal is measured, based on the induced signal, after removing radio frequency components from the induced signal by the detector, thereby enabling a measurement of a variation in input radio frequency energy caused by the optogalvanic effect.

6. A method for stabilizing the laser power and frequency of a radio frequency excited laser using an optogalvanic effect, comprising the steps of:
    appropriately moving a grating included in a laser cavity of the laser, thereby selecting a wavelength of oscillating laser beam;

applying a sine wave signal to a piezo electric transducer included in the laser cavity, thereby generating an optogalvanic signal in a radio frequency discharge tube, resulting in a variation in radio frequency energy introduced into or reflected from a discharge tube arranged in the laser cavity;

inducing a part of the radio frequency energy toward a detector;

removing radio frequency components from the induced radio frequency energy by the detector, thereby generating an optogalvanic signal free of radio frequency components;

executing a detection for the optogalvanic signal based on a sine wave, and then executing a synchronous detection of the resultant optogalvanic signal by a lock-in stabilizer, thereby deriving a voltage proportional to a gain curve given for the laser and the position of a vertex of the gain curve;

integrating the signal derived by the synchronous detection, converting the resultant signal into the form of a DC voltage;

applying the resultant signal to the piezo electric transducer; and repeating the above steps to continuously vary the length of the laser cavity until the signal derived by the synchronous detection has a zero level, thereby causing the laser to oscillate at the vertex of the gain curve so as to maintain the laser cavity to be constant in length.

7. The method according to claim 6, wherein the step of inducing a part of the radio frequency energy is carried out using a capacitor coupled to a radio frequency energy inlet of the radio frequency discharge tube, the capacitor serving to induce a part of radio frequency energy, introduced into the radio frequency discharge tube, toward the detector, so that the optogalvanic signal is measured, based on the induced signal, after removing radio frequency components from the induced signal by the detector, thereby enabling a measurement of a variation in input radio frequency energy caused by the optogalvanic effect.

8. The method according to claim 6, wherein the step of inducing a part of the radio frequency energy is carried out using a toroidal coil coupler, through which a radio frequency energy input line of the radio frequency discharge tube extends, the toroidal coil coupler being coupled to the detector, so that the optogalvanic signal is measured, based on a voltage signal generated across the toroidal coil coupler, after removing radio frequency components from the voltage signal by the detector, thereby enabling a measurement of a variation in input radio frequency energy caused by the optogalvanic effect.

9. The method according to claim 6, wherein the step of inducing a part of the radio frequency energy is carried out using a bi-directional coupler coupled to a radio frequency energy input line of the radio frequency discharge tube and to the detector, the bi-directional coupler serving to induce a part of radio frequency energy, introduced into the radio frequency discharge tube, toward the detector, so that the optogalvanic signal is measured, based on the induced signal, after removing radio frequency components from the induced signal by the detector, thereby enabling a measurement of a variation in input radio frequency energy caused by the optogalvanic effect.

10. The method according to claim 6, wherein the step of inducing a part of the radio frequency energy is carried out using a bi-directional coupler coupled to a radio frequency energy input line of the radio frequency discharge tube and to the detector, the bi-directional coupler serving to induce a part of radio frequency energy, reflected from the radio frequency discharge tube, toward the detector, so that the optogalvanic signal is measured, based on the induced signal, after removing radio frequency components from the induced signal by the detector, thereby enabling a measurement of a variation in input radio frequency energy caused by the optogalvanic effect.

* * * * *